United States Patent
Wilkinson (12)

(10) Patent No.: US 6,802,618 B2
(45) Date of Patent: Oct. 12, 2004

(54) OPTICAL SCREEN APPARATUS HAVING ALTERNATE OPAQUE AND CLEAR LAYERS AND METHOD OF MAKING SUCH APPARATUS

(76) Inventor: Kerry E. Wilkinson, 5750 W. Linda La., Chandler, AZ (US) 85226

( * ) Notice: Subject to any disclaimer, the term of this patent is extended or adjusted under 35 U.S.C. 154(b) by 221 days.

(21) Appl. No.: 10/078,298

(22) Filed: Feb. 20, 2002

(65) Prior Publication Data

US 2003/0156329 A1 Aug. 21, 2003

(51) Int. Cl.$^7$ .............................................. G02B 27/00
(52) U.S. Cl. ...................... 359/614; 359/454; 359/599; 359/601
(58) Field of Search ................................ 359/614, 454, 359/599, 601–603, 613, 707; 385/115, 119; 428/196

(56) References Cited

U.S. PATENT DOCUMENTS

| 4,811,179 A | * | 3/1989 | Komatsu et al. ............ 362/256 |
| 5,321,417 A | * | 6/1994 | Voelzke et al. ................ 345/32 |
| 6,076,293 A | * | 6/2000 | Bergeron ...................... 40/503 |
| 6,131,322 A | * | 10/2000 | Hjaltason ..................... 40/615 |
| 6,275,339 B1 | * | 8/2001 | Chazallet et al. ........... 359/599 |
| 6,636,686 B1 | * | 10/2003 | Belfer ......................... 385/104 |

* cited by examiner

Primary Examiner—Mohammad Sikder
(74) Attorney, Agent, or Firm—H. Gordon Shields

(57) ABSTRACT

An optical screen panel and a method of making an optical screen panel is disclosed. The panel includes layers or rows of alternating, or interleaved, light transmitting and light blocking or opaque elements, and is extruded. The layers or rows are in the form of relatively small ribbon elements which are generally parallel to the direction of viewing, and thus generally perpendicular to the front plane of the panel itself, which is the viewing surface of the panel. Several embodiments are shown, including panels with light directing elements and light scattering elements. The light directing and scattering elements may be embossed in the extruding process or they may be extruded as separate layers and secured to the layered panel post extruding. Angled and curved layers are among the several embodiments. Ultra violet protection may also be provided to the optical screen layered panel. When no light source is "on," and thus no light is being transmitted, the optical screen panel appears opaque. The alternating layers enhance the resolution of a picture or message displayed on the optical screen panel.

19 Claims, 6 Drawing Sheets

OPTICAL SCREEN APPARATUS HAVING ALTERNATE OPAQUE AND CLEAR LAYERS AND METHOD OF MAKING SUCH APPARATUS

BACKGROUND OF THE INVENTION

1. Field of the Invention

This invention relates to optical screens, and, more particularly, to optical screens having relatively thin alternating layers of clear, light transmitting elements and opaque elements and to a method of making such screens by extrusion.

2. Description of the Prior Art

U.S. Pat. No. 5,381,502, U.S. Pat. No. 5,625,736, and U.S. Pat. No. 5,668,907, all by Veligdon, disclose optical panels having waveguides interleaved with opaque elements to provide optical display panels, with the opaque elements interleaved with the optical waveguides for purposes of increasing the resolution of images on the panels. The panels are conventional with respect to the prior art in the sense that they are generally flat, sheet type panels, coextruded generally perpendicular to a viewer, and generally parallel to a major surface, the viewing surface.

SUMMARY OF THE INVENTION

The invention described and claimed herein comprises extruded polymer elements, with light transmitting polymer elements and opaque polymer elements interleaved, or alternating with, the light transmitting elements to comprise an optical screen apparatus, and a method of making the screen apparatus. The optical screen apparatus is extruded in ribbons, as opposed to the prior art sheet elements. Several embodiments are disclosed. The screen apparatus has an appearance of being opaque because the apparatus includes many alternating small layers or ribbons. Due to well known principles of total internal reflection, light that enters the apparatus is efficiently transmitted to the front surface for observation by a viewer. The ribbon layers are generally parallel to a viewer, and generally perpendicular to the plane of a major surface, namely the front viewing surface. The appearance of the extruded screen apparatus prior to illumination by an appropriate light source, is opaque. Diffusion and light directing elements and ultraviolet protection may be coextruded or formed with the basic light directing and opaque elements or they may be added to the basic screen after the screen has been extruded. Included in the embodiments of the present invention are angled and curved elements. Since their and curve are relatively small, they are still considered to be generally parallel and perpendicular, as referred to above.

Among the objects of the present invention are the following:

To provide a new and useful optical screen apparatus;

To provide a new and useful screen apparatus having alternating light transmitting and opaque elements;

To provide new and useful optical screen apparatus including a plurality of extruded ribbons of alternating light transmitting and opaque elements;

To provide new and useful optical screen apparatus having light directing elements;

To provide new and useful optical screen apparatus having light diffusing elements;

To provide new and useful optical screen apparatus having light directing and light diffusing elements;

To provide new and useful optical screen apparatus including an ultraviolet light inhibiting layer;

To provide a new and useful method of making an optical screen apparatus;

To provide a new and useful method of extruding an optical screen apparatus;

To provide a new and useful method of extruding polymer elements having alternating ribbons of light transmitting and opaque elements;

To provide a new and useful method of forming an optical screen apparatus having light directing and light diffusing elements; and To provide a new and useful method of forming an optical screen apparatus having an ultraviolet protective layer.

DESCRIPTION OF THE PREFERRED EMBODIMENT

Figure 1:
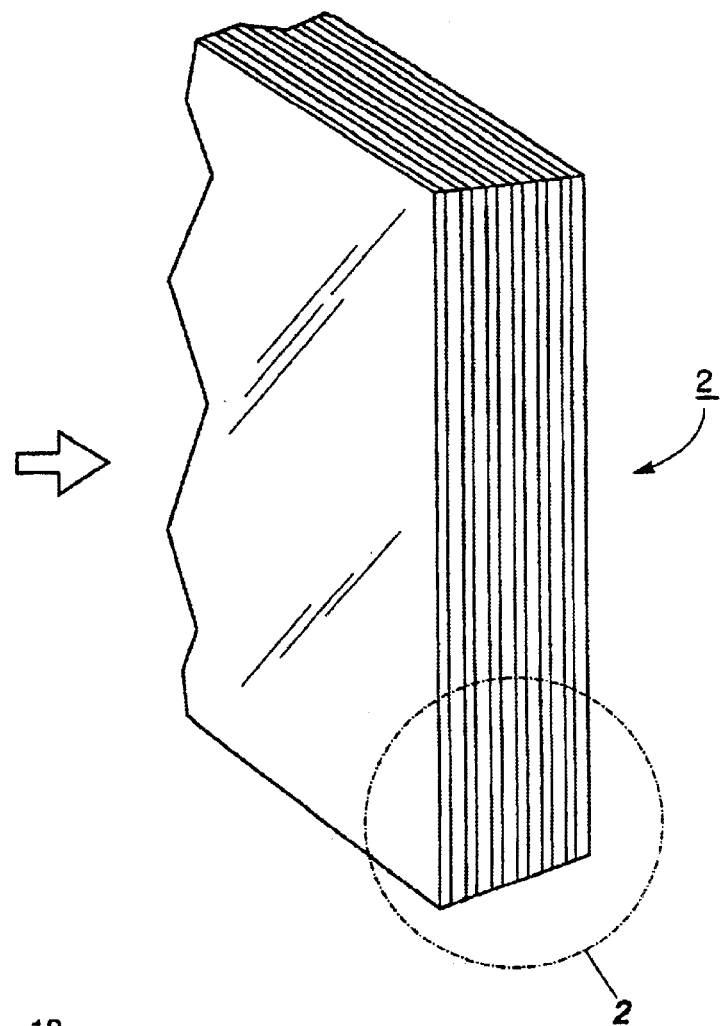
FIG. 1 is a perspective view of a prior art extruded multilayer element.
Figure 2:
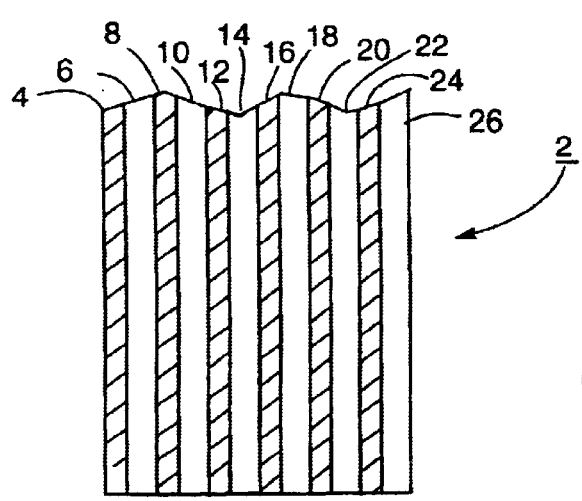
FIG. 2 is an view in partial section of a portion of FIG. 1 taken generally from Circle 2 of FIG. 1.

FIG. 1 is a portion of a multilayer extruded panel 2 embodying the prior art. FIG. 2 is enlarged view of a portion of the panel 2 taken generally from Circle 2 of FIG. 1. For the following discussion, reference will be made to both FIGS. 1 and 2.

The extruded panel 2 includes a plurality of layers 4, 6, 8, 10, 12, 14, 16, 18, 20, 22, 24, and 26. The layers 4 . . . 26 are coextruded as sheets. This sheet layering is typical of the prior art. For purposes of helping to explain the apparatus fo FIGS. 1 and 2, alternate layers are hatched in FIG. 2 to represent the different layers. The layers without hatching represent light transmitting layers have one refractive index, and the hatched layers represent light transmitting layers which have a different refractive index. Both types of layers are transparent, but have different refractive indices. Thus, layers 4, 8, 12, 16, 20, and 24 represent layers having a first refractive index, while layers 6, 10, 14, 18, 22, and 26 represent layers having a refractive index different from that of layers 4, 8, 16, 20, and 24.

For purposes of illustrating the prior art in optical screen apparatus, viewing the panel 2 would be generally perpendicular to the major axis of the panel, or in the direction illustrated by the relatively large open arrow in both FIGS. 1 and 2. The layers 4 . . . 26 are themselves generally parallel to each other, and, of course, generally perpendicular to the direction of viewing. Thus, typically, the prior art coextruded sheet panels have layers which are generally parallel to a major surface, namely the viewing surface, and accordingly generally perpendicular to a viewer.

It will be noted that the alternate layer hatching format used in FIG. 2 will be followed in the other drawing Figures hereof, particularly in the sectioned views. However, the layers with the hatching for FIG. 3 and the following FIGS. generally indicate opaque layered material, while the light transmitting layers are generally without hatching.

Figure 3:
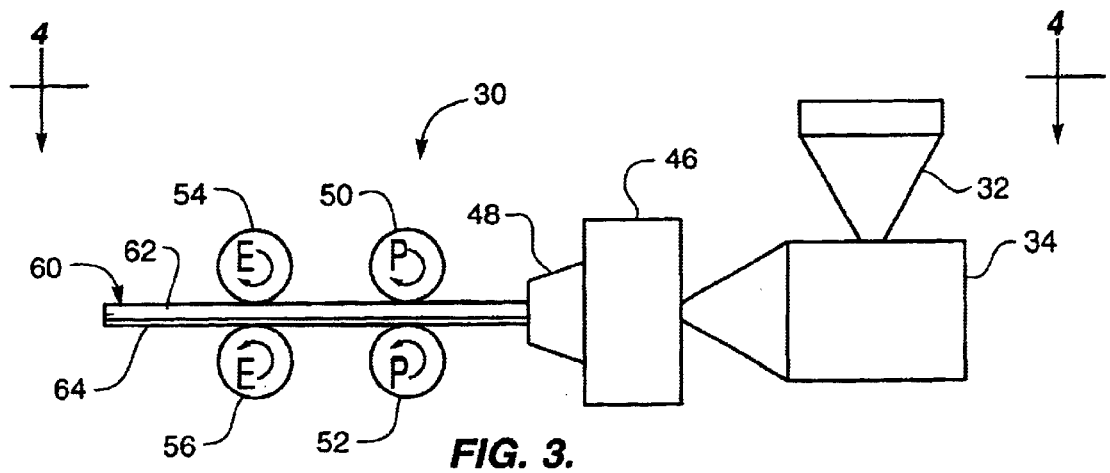
FIG. 3 is a side schematic representation of apparatus for extruding optical panels of the present invention and illustrating a panel extruded by the apparatus.
Figure 4:
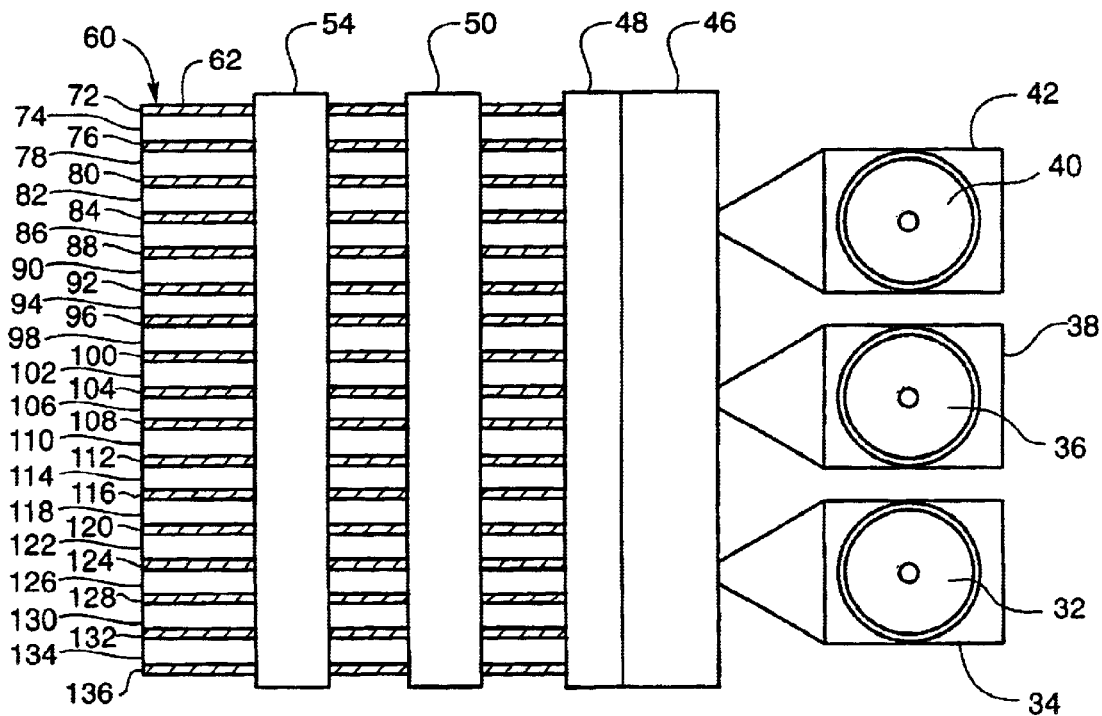
FIG. 4 is a top view of the apparatus and panel of FIG. 1 taken generally along line 4—4 of FIG. 3.

The several embodiments of optical screen panel apparatus of the present invention are extruded in relatively small, thin, ribbons of alternating opaque and light transmitting layers. Apparatus for extruding such panels is schematically illustrated in FIGS. 3 and 4. FIG. 3 is a side view of extruding apparatus 30, and FIG. 4 is a top view of the apparatus 30, taken generally along ling 4—4 of FIG. 4. For the following discussion, reference will generally be made to both FIGS. 3 and 4.

The apparatus 30 includes three hoppers 32, 36, and 40. The hopper 32 is disposed on top of an extruder 34, the hopper 36 is on top of an extruder 38, and the hopper 40 is on top of an extruder 42. The three extruders 34, 38, and 42 are connected to a feed block 46. An extrusion die 48 is connected to the feed block 46.

The feed block 46 extrudes an optical screen panel 60 of the present invention. The panel 60 moves from the extrusion die 48 by a pair of pulling rollers 50 and 52. If it is desired to emboss the panel 60, a pair of embossing rollers 54 and 56 are located downstream from the pulling rollers 50 and 52.

The extruded optical screen panel 60, as shown in FIGS. 3, 4, 5, and 6, includes an upper layer 62, which is a multi component layer, includes a plurality of alternating rows of opaque and light transmitting ribbons, as discussed in detail hereafter and shown in FIG. 4. The optical screen panel apparatus 60 also includes a lower layer 64, which is a mono component layer, such as an ultra violet protective layer, coextruded integrally with the multi component layer 62. For most of the following discussion of the apparatus 60, and of the several embodiments, the discussion will be primarily concerned with the multi component layer, which includes alternating or interleaved ribbon rows of light transmitting and light blocking components or elements.

Figure 5:
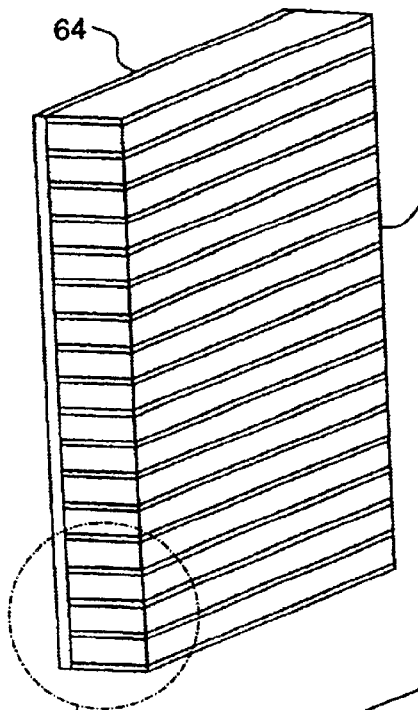
FIG. 5 is a perspective view of the panel illustrated in FIGS. 3 and 4.
Figure 6:
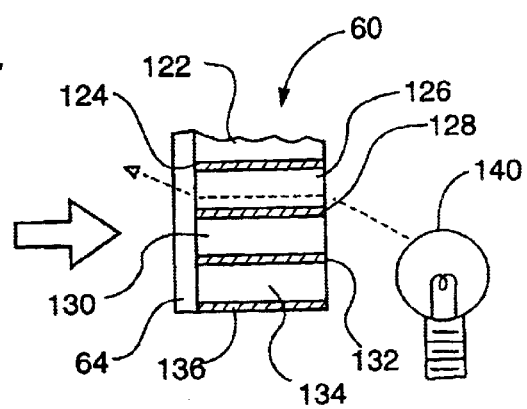
FIG. 6 is an enlarged view of a portion of the panel of FIG. 5 taken generally from circle 6 of FIG. 5 and illustrating the use of the panel.

Details of the panel 60 are also shown in FIGS. 5 and 6, as well as FIG. 4, and will be discussed below in conjunction with those figures.

Illustratively, there are thirty three discrete ribbon layers or rows shown in FIG. 4 in the upper layer 62. The layers include rows or layers 72, 74, 76, 78, 80, 82, 84, 86, 88, 90, 92, 94, 96, 98, 100, 102, 104, 106, 108, 110, 112, 114, 116, 118, 120, 122, 124, 126, 138, 130, 132, 134, and 136. The hatched rows or layers 72, 76, 80, 84, 88, 92, 96, 100, 104, 108, 112, 116, 120, 124, 128, 132 and 136 are opaque rows or layers, and the alternating rows or layers, non-hatched, are light transmitting layers. Obviously, there may be as many rows or layers as desired in a panel. The thirty three rows or layers are accordingly merely exemplary.

Moreover, there will be as many hoppers and extruders as required for the particular panels being extruded. Similarly, the extrusion die will have the appropriate die elements required for the particular panels being extruded. Thus, FIGS. 3 and 4 are illustrative only. It will be understood that extruded layers may be appropriately secured together to provide a screen having the desired number of discrete layers or ribbons. Thus, if an extrusion die provided a panel of only six or eight layers, etc., a completed panel may be fabricated by securing together as many smaller panels as desired.

FIG. 5 is a perspective view of the panel 60, and FIG. 6 is an enlarged view of a portion of FIG. 5 taken generally from Circle 6 of FIG. 5, and schematically illustrating the optical use of the panel 70. For the following discussion, reference will primarily be made to FIGS. 5 and 6. Note that both the layer 62 and the ultra violet protective layer 64 are shown in the Figures.

The optical screen panel apparatus 60 is relatively thin, with the ribbon layers or rows alternating between opaque and light transmitting in the layer 62, as indicated above. A lamp 140 is schematically illustrated as being a light source for the panel 60, with a single light ray extending to the light transmitting ribbon layer 126 and passing through the layer 126 and outwardly therefrom. The light ray from the source 140 is indicated by a dashed arrow. The direction of viewing of the optical screen panel apparatus 60 is again illustrated by the large open arrow. That is, the front surface of the layered optical panel 60 is adjacent to the large open arrow, and the rear or back surface of the panel 60 is adjacent to the lamp 140.

Obviously, light rays from the lamp 140, or from any appropriate light source, will impinge on more than merely the one layer as illustrated. The light ray from the source 140 is merely illustrative of the principles of the present invention. The light ray from the lamp or source 140 is reflected through or along the layer 126 and then scatters outwardly from the front of the panel apparatus 60.

Figure 7:
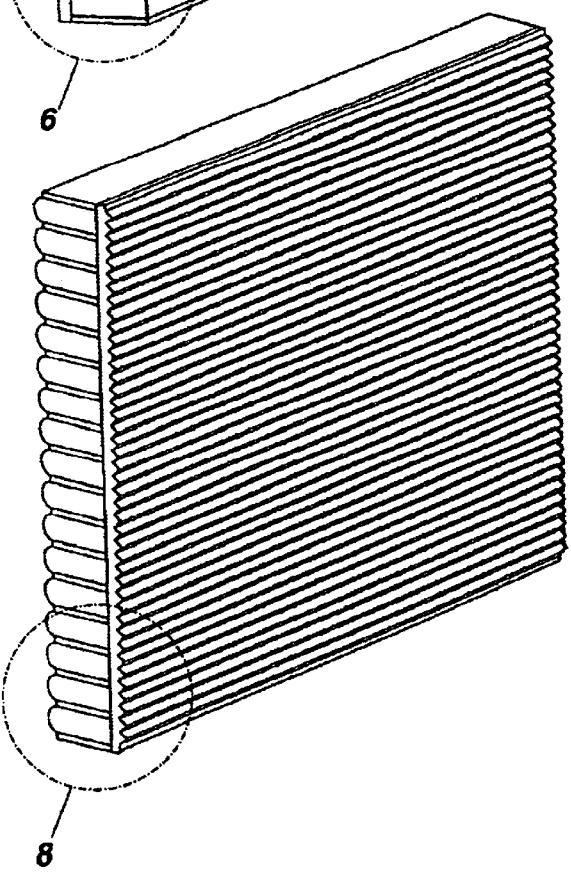
FIG. 7 is a perspective view of an alternate embodiment of an optical screen apparatus of the present invention.
Figure 8:
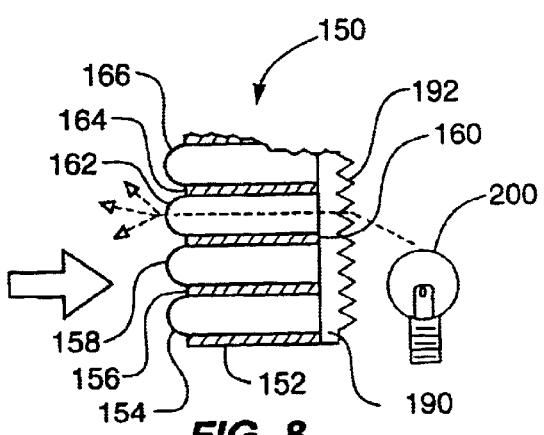
FIG. 8 is an enlarged view of the panel of FIG. 7 taken generally from Circle 8 of FIG. 7. and illustrating the use of the panel.

FIG. 7 is a perspective view of an alternate embodiment comprising an optical screen panel apparatus 150. FIG. 8 is an enlarged and view of a portion of the panel apparatus 150 taken generally from Circle 8 of FIG. 7, and schematically illustrating the optical properties of the panel apparatus 150. For the following discussion, reference will primarily be made to both FIGS. 7 and 8.

The panel apparatus 150 includes alternating opaque layers and light transmitting layers or rows, and a back or rear light directing layer. The panel 150 includes a plurality of opaque layers or rows, including layers 152, 156, 160, and 164. Interleaved or alternating with the opaque layers or rows is a plurality of light transmitting layers or rows, including layers 154, 158, 162, and 166. For purposes of illustration and clarity, only those layers shown in FIG. 8 include reference numbers.

At the front face of the panel 150, the light directing layers include a smoothly rounded front edges defining a front face. The rounded front edges of the light transmitting layers comprises light scattering surfaces for light transmitted through the layers or rows.

At the rear of the interleaved layers of the panel 150 is a light directing panel 190. The light directing panel 190 includes a continuous prismatic, sawtooth rear surface or face 192. The sawtooth configured rear surface 192, which comprises a series of prism elements, directs light from a source 200 into the respective light transmitting layers. The prism elements are on the rear surface of the light transmitting layers or rows for directing light into those layers or rows.

The path of the light from the source 200 is schematically illustrated by the dashed line through the panel 190, through on of the prism or sawtooth elements 192, through the layer 166, and scattered outwardly from the rounded front edge of the layer 166. The direction of viewing of the panel 150 is again illustrated by the large open arrow.

The front face of the light transmitting layers may be rounded by the embossing rollers (see FIGS. 1 and 2) in the extruding process. Similarly, the prism elements 192 of the layer 190 may be formed in the extruding process by the embossing as the layer 190 is extruded. (See FIG. 3, and the accompanying discussion, above.)

Figure 9:
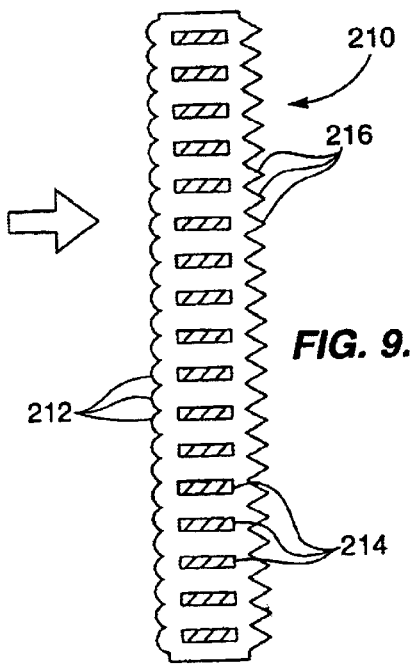
FIG. 9 is an end view of another alternate embodiment of the present invention.

FIG. 9 is an end view schematically illustrating another alternate embodiment of the panel apparatus of the present invention. A panel 210 includes an integral light directing rear face, with rounded light scattering front edges on its light transmitting rows or layers, and opaque elements within the panel, alternating with light transmitting layer elements or rows. The panel 210 is a modification of the panel 150 of FIGS. 7 and 8, with the light transmitting, directing, and scattering elements integral rather than separate. The opaque elements are embedded within what amounts to a single light transmitting element. The opaque elements substantially define separate light transmitting elements within or from the overall extruded single element panel apparatus.

The panel 210 includes a plurality of light transmitting elements 212, each of which includes a rounded light scattering front face. Interleaved or embedded within the panel 210 is a plurality of opaque elements 214. The opaque elements 214 separate each light transmitting element 212 from adjacent light transmitting elements.

At the rear of each light transmitting row or element 212 is alight directing prism element 216. The light directing prism elements 216 are in a continuous sawtooth configuration, as discussed above. The light directing prism elements 216 are in a continuous sawtooth their respective light transmitting elements, thus providing an integral light directing, light transmitting, and light scattering element, with each element or row of a plurality of rows or elements in a panel separated by an embedded opaque element.

Both the rounded light scattering front faces of the light transmitting elements or layers 212 and the prism or light directing rear faces 216 of the layers 212 may be accomplished by embossing during the extruding process, as discussed above.

Again, the direction of viewing of the panel 210 is illustrated by a large open arrow.

Figure 10:
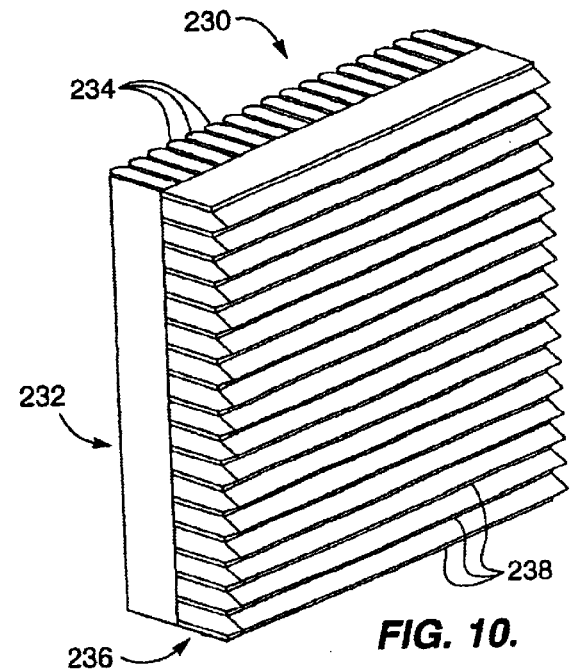
FIG. 10 is a perspective view of another alternate embodiment of the present invention.

FIG. 10 comprises a perspective view of a double panel 230. The double panel 230 includes two panels 232 and 234 secured together with the ribbon layers or rows of the respective panels 232 and 234 disposed substantially perpendicular to each other in a back to back relationship.

The panels 232 and 236 are illustrated as having alternating layers of opaque elements and light transmitting elements. The panel 232 includes light transmitting elements 234 having rounded light scattering front faces. The panel 236 includes light directing elements 238 on its "rear" face. Since the panels 232 and 236 are appropriately secured together in a back to back relationship, the back surfaces of the two panels are generally flat for maximum light transmission.

If desired, of course, only one of the panels 232 or 236 may include light scattering or light directing elements on its light transmitting elements or rows, and the other of the panels may have a flat face for its light transmitting elements, or the panels may have any desired combination of faces on the light transmitting elements. The light scattering elements and the light directing elements on the panels would, of course, depend on the direction of viewing of the panel apparatus 230, with the light directing on the "back," and the light scattering on the "front".

Again, the rounded light scattering or prismatic light directing faces of the light transmitting elements may be formed by embossing during the extruding process, or they may be added later, as discussed above.

Figure 11:
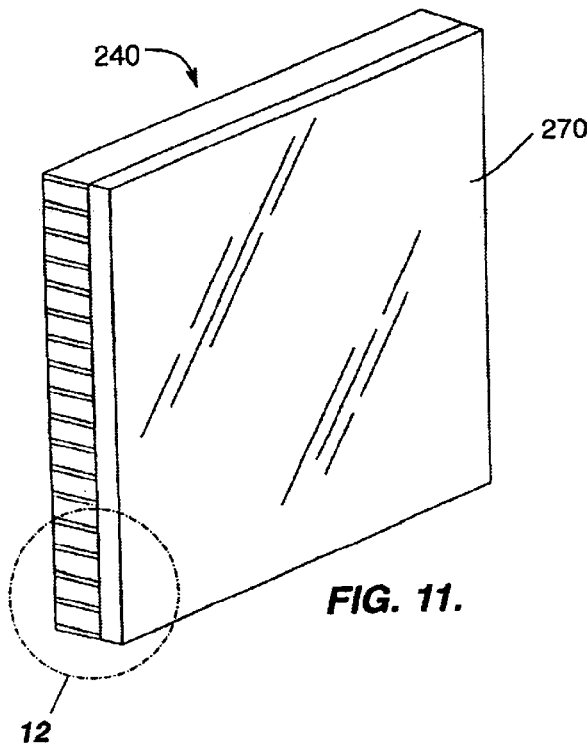
FIG. 11 is a perspective view of another alternate embodiment of the present invention.
Figure 12:
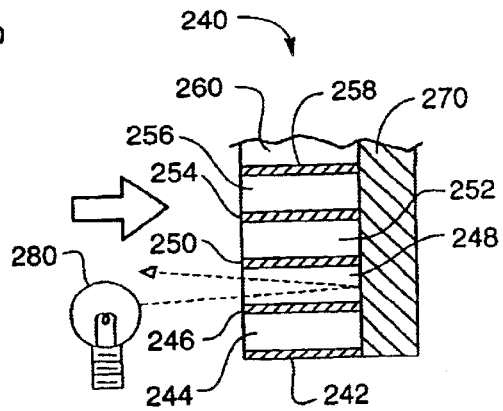
FIG. 12 is an enlarged view in partial section taken generally from Circle 12 of FIG. 11, illustrating the use of the embodiment.

FIG. 11 is a perspective view of another alternate embodiment of the present invention, comprising a panel 240 having an opaque back wall 270. FIG. 12 is an enlarged view of a portion of FIG. 11 in partial section taken generally from Circle 12 of FIG. 11. For the following discussion, reference will primarily be made to both FIGS. 11 and 12. For ease of illustration, most of the reference numerals have been omitted from FIG. 11, while the elements shown in FIG. 12 are given reference numerals.

The panel 240 includes a plurality of alternating or interleaved opaque and light transmitting ribbon layers or rows, a few of which are illustrated in FIG. 12. Shown in FIG. 12 are opaque layers or rows 242, 246, 250, 254, and 258. Alternating with the opaque ribbon layers or rows are light transmitting ribbon layers or rows 244, 248, 252, 256, and 260. The front faces of the light transmitting layers are flat, as opposed to the rounded, light scattering front faces of some of the panels discussed above. Obviously, if desired, the front faces of the light transmitting layers may be rounded for light scattering purposes. However, for illustrative purposes, the front faces are shown as flat.

Bonded to the flat rear faces of both the opaque layers and the light transmitting layers is an opaque layer 270, which reflects light back from a front light source 280. The path of the light from the source 280 is illustrated by the dashed line into and out of the light transmitting element 248. The reflective, opaque layer 270 may be coextruded with the ribbon layers or it may be added post extrusion, as desired.

Once again, the direction of viewing of the optical screen panel apparatus 240 is illustrated by the relatively large open arrow in FIG. 12.

Figure 13:
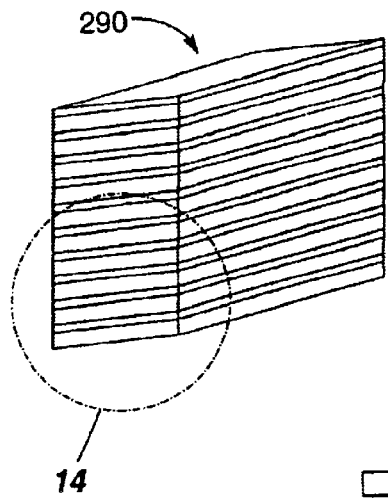
FIG. 13 is a perspective view of another alternate embodiment of the present invention.
Figure 14:
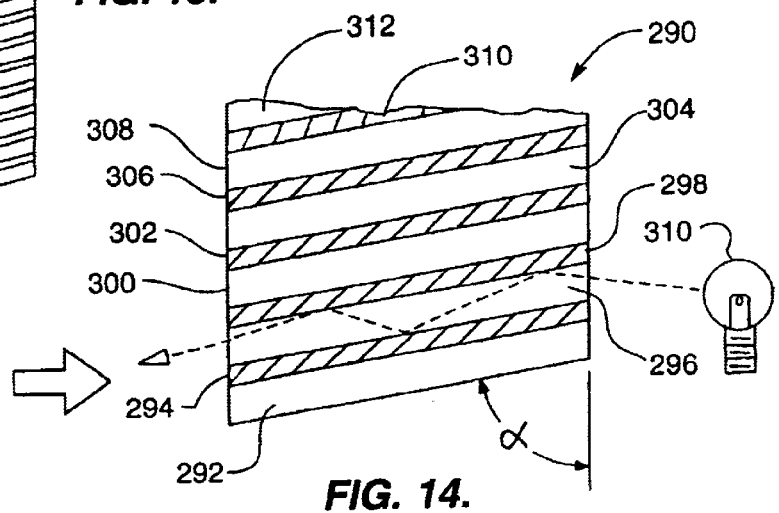
FIG. 14 is an enlarged view in partial section of a portion of the apparatus of FIG. 13, taken generally from Circle 14 of FIG. 13.

FIG. 13 is a perspective view of another alternate embodiment of the present invention, comprising optical screen panel apparatus 290 in which the ribbon layers are oriented at an angle from the vertical other than pure or true perpendicular. The previously discussed embodiments have the layers disposed perpendicularly to the viewing surface, and the layers in the apparatus 290, while still generally perpendicular, are slightly off the true perpendicular. FIG. 14 is an enlarged view in partial section of the panel 290 taken generally from Circle 14 of FIG. 13. For the following discussion, reference will primarily be made to both FIGS. 13 and 14. Again, reference numerals are primarily used in the enlarged illustration of FIG. 14.

The ribbon rows or layers in the panel apparatus 290, as shown in FIG. 14, are oriented at an appropriate or desired angle alpha from the vertical. The ribbon layers or rows in the panel apparatus 290 include alternating light transmitting and opaque layers or rows, including light transmitting layers or rows 292, 296, 300, 304, 308, and 312. Included with, and interleaved, or alternating, with the light transmitting layers are opaque layers or rows 294, 298, 302, 306 and 310. The ribbon layers are oriented at a downward slope for purposes of viewing. The direction of viewing is once again shown by the relatively large open arrow in FIG. 14.

The light transmission from a light source 310 is shown in FIG. 14, with the path of a ray from the light source illustratively shown in light transmitting ribbon element 296. The total internal reflection principle allows the light rays to be transmitted through the panel apparatus 290 with virtually insignificant losses.

The angle alpha is generally coordinated with the thickness of the light transmitting elements such that there is not a clear view through the panel from generally perpendicular to the front face. That is, a viewer from the front of the panel 290, looking at the panel in the general direction of the open arrow, would not see through the panel, but would view the opaque layers, and thus the appearance of the apparatus would be opaque when no light is being transmitted.

Figure 15:
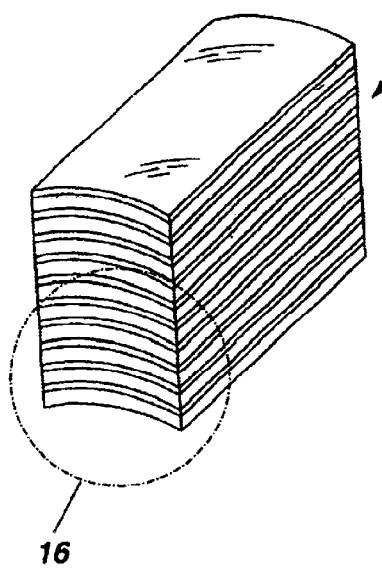
FIG. 15 is a perspective view of another alternate embodiment of the present invention.
Figure 16:
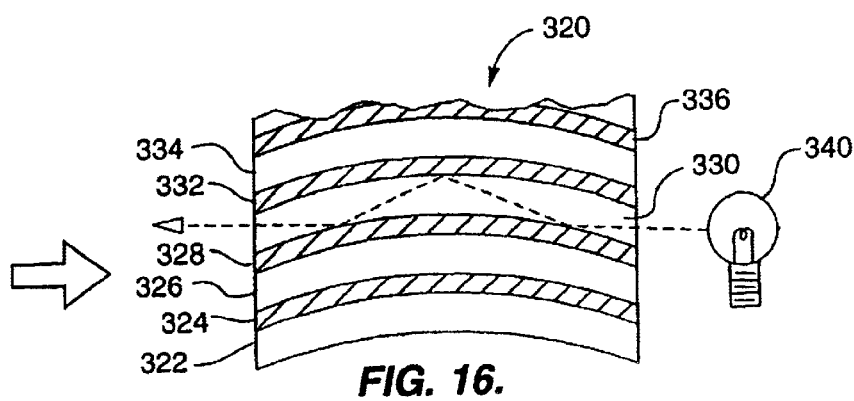
FIG. 16 is an enlarged view in partial section of a portion of the apparatus of FIG. 15 taken generally from Circle 16 of FIG. 15.

FIG. 15 is a perspective view of another alternate embodiment of the apparatus of the present invention, comprising optical screen panel apparatus 320 in which the ribbon layers or rows are slightly curved. FIG. 16 is an enlarged view in partial section of a portion of the panel apparatus 320 taken generally from Circle 16 of FIG. 15. For the following discussion, reference will primarily be made to both FIGS. 15 and 16. As with some of the previous drawing Figures, reference numerals are primarily shown in the enlarged view of the apparatus 320, namely FIG. 16.

The panel 320 includes, as with the previous embodiments, alternate ribbon layers or rows of light transmitting and opaque elements. In FIG. 16, the ribbon light transmitting layers or rows are indicated by reference numerals 322, 326, 330, and 334. The interleaved opaque ribbon layers or rows are indicated by reference numerals 324, 328, 332, and 336.

The path of a ray of light from a source 340 is illustrated by the dashed line through the light transmitting layer 330. The various ribbon layers in the panel 320 are curved, and accordingly the light rays must be reflected, in accordance with the principle of total internal reflection, as referred to above.

The curvature of the panel is generally coordinated with the thickness of the clear, light transmitting elements so that there is no straight through view through the panel from generally perpendicularly to the front face, or as indicated by the large open arrow, and generally as indicated above for the angled panel apparatus 290. The panel accordingly appears opaque when no light is being transmitted.

Figure 18:
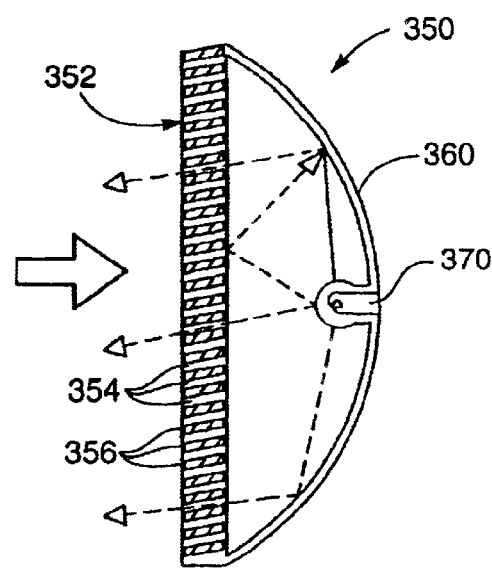
FIG. 18 is a view in partial section of the apparatus of FIG. 17 taken generally along line 18—18 of FIG. 17.
Figure 19:
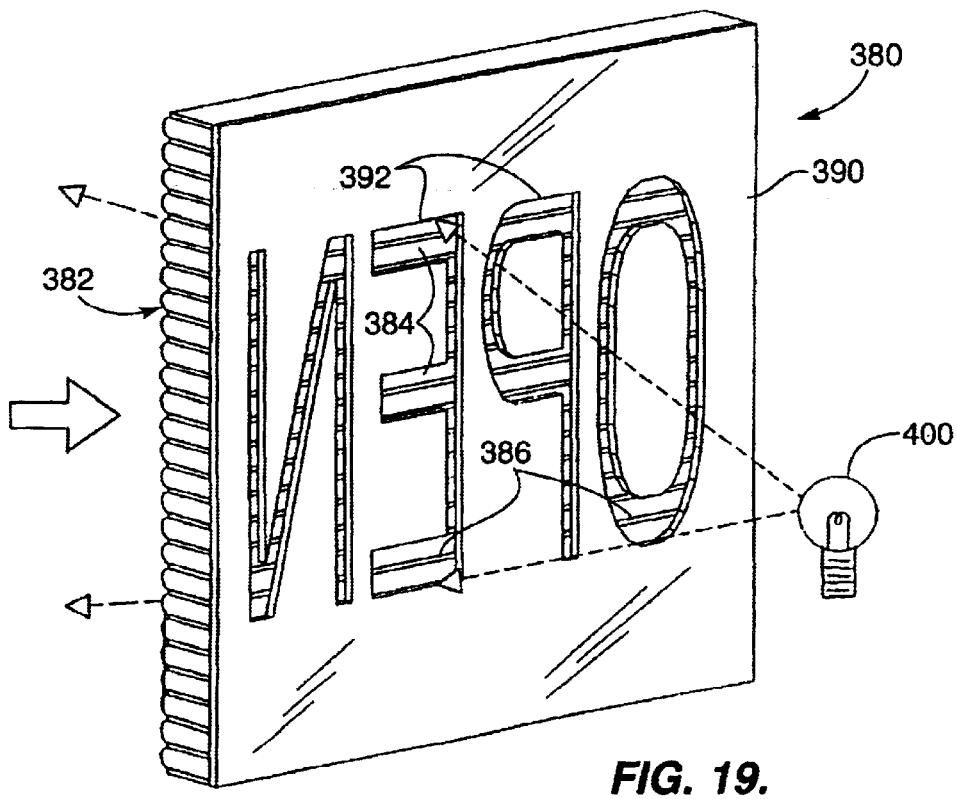
FIG. 19 is a schematic perspective representation of a use application for the apparatus of the present invention.

FIG. 18 is a front plan view of generally round optical display apparatus 350, which includes an extruded optical screen panel 352 of the present invention. FIG. 19 is a view in partial section of the apparatus 350 of FIG. 18 taken generally along line 19—19 of FIG. 18. For the following discussion, reference will primarily be made to both FIGS. 18 and 19.

The optical display panel 352 includes alternating clear, light transmitting ribbon layers or rows 354 and opaque light blocking ribbon layers or rows 356. The layers 354 and 356 are disposed at an angle with respect to the vertical, similar to that shown in FIGS. 13 and 14. The front face of the panel is illustrated as being generally flat.

The panel is secured to a housing or frame 360. The housing or frame 360 has a generally concave interior configuration. A light source 370 is disposed in the center of the housing or frame 360. The concave interior of the frame 360 reflects light from the source 370, and also the rear faces of the opaque elements 356 reflect light back to the concave interior of the frame 360, and the light, both direct from the source 370 and reflected light, is transmitted through the light transmitting elements 354. The paths of the light rays, both direct and reflected, from the source 370 is shown by the dashed lines from the source 370. The direction of viewing of the apparatus 350 is again shown by the relatively large open arrow in FIG. 18.

Figure 17:
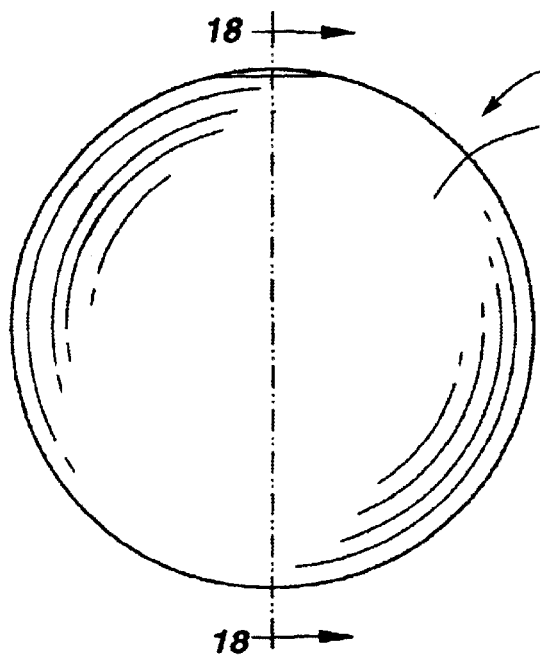
FIG. 17 is a front plan view of another alternate embodiment of the apparatus of the present invention.

It will be noted that the front of the panel 352 in FIG. 17 is not shown in solid black, but to a viewer from the front, the optical screen panel 352 would appear opaque until or unless the light source 370 is illuminated to provide the desired message or picture on the screen panel 352.

FIG. 19 is a perspective view of a use application of the apparatus of the present invention, comprising optical screen apparatus 380. The apparatus 380 includes an extruded panel 382, which includes a plurality of alternating light transmitting, clear ribbon layers or elements 384 interleaved or alternating with opaque, light blocking, ribbon layers or elements 386. As shown in FIG. 19, the front ends or front faces of the light transmitting elements 384 are rounded to scatter the light transmitted through the panel 382.

Secured to the back face of the panel 382 is a back panel 390. The back panel 390 is opaque or light blocking except where four message openings 392 extend through the panel. Seen through the openings 392 of the panel 390 are the light transmitting layers 384 and the light blocking layers 386 (not hatched for clarity).

A light source 400 is shown spaced apart from the panel 390. Light rays from the source 400 pass through the openings 392 and through the appropriate light transmitting layers 384 of the panel 382 to provide an illuminated message for a viewer. Dashed lines from the source 400 illustrate the path of part of the light from the source, through the panel 390 and the panel 382.

It will be noted that the thickness of the light transmitting layers in the various embodiments is considerably greater than the thickness of the opaque, light blocking, layers. The resolution of the respective layers provides an overall opaque appearance when no light source is provided.

The respective layers are appropriate polymers. For example, polystyrene or polymethyl methacrylate for the light transmitting layers or rows, and ethylene vinyl acetate or polymethyl methacrylate for the opaque layers or rows. Polyester or other appropriate polymer may be used for an ultraviolet protective layer.

As is well known and understood, the light transmitting layer material must have a refractive index of 0.02 or greater than that of the opaque material. This, of course, as in accordance with the principle of total internal reflection. The greater the difference in the refractive indices, the greater the efficiency in the light transmission.

While the principles of the invention have been made clear in illustrative embodiments, without departing from those principles there may occur to those skilled in the art modifications of structure, arrangement, proportions, the elements, materials, and components used in the practice of the invention, or otherwise, which are particularly adapted to specific environments and operative requirements. The appended claims are intended to cover and embrace any and all such modifications within the limits only of the true spirit and scope of the invention.

I claim:

1. An optical screen apparatus comprising in combination:

a first plurality of light transmitting elements;

a second plurality of light blocking elements; and the first and second pluralities of elements are disposed generally parallel to a viewer and generally perpendicular to a viewing surface.

2. The optical screen apparatus of claim 1 in which the elements of the first and second pluralities of elements comprise ribbons of polymers.

3. The optical screen apparatus of claim 1 in which the first and second pluralities of elements include a front viewing face and a rear face.

4. The optical screen apparatus of claim 3 in which the first plurality of light transmitting elements includes rounded front ends at the front face to scatter light transmitted through the elements.

5. The optical screen apparatus of claim 4 in which the first plurality of light transmitting elements further includes prism elements at the rear face for directing light into the light transmitting elements.

6. The optical screen apparatus of claim 3 in which the first plurality of light transmitting elements includes light directing elements at the rear face for directing light into the light transmitting elements.

7. The apparatus of claim 1 in which the light blocking elements are opaque.

8. The apparatus of claim 1 in which the first and second pluralities of elements each have a refractive index, and the light transmitting elements have a refractive index at least 0.02 greater than that of the light blocking elements.

9. The optical screen apparatus of claim 1 in which the first and second pluralities of elements each have a thickness, and the thickness of the first plurality is greater than the thickness of the second plurality.

10. The optical screen apparatus of claim 9 in which the first and second pluralities are angularly oriented with respect to the vertical at an angle correlated to the thicknesses of the first and second pluralities for the optical screen apparatus to appear generally opaque at the viewing surface when no light is being transmitted.

11. The apparatus of claim 9 in which the first and second pluralities of elements have a front face at the viewing surface and a rear face remote from the viewing surface.

12. The apparatus of claim 11 in which the first and second pluralities of elements are curved between the front and rear faces.

13. The apparatus of claim 12 in which the curvature of the first and second pluralities of elements is correlated to the thicknesses of the elements such that the viewing surface appears opaque when no light is being transmitted.

14. The apparatus of claim 1 in which the second plurality of light blocking elements is embedded in the first plurality of light transmitting elements.

15. The apparatus of claim 1 in which the first and second pluralities of elements comprise a first layer.

16. The apparatus of claim 15 which further includes a second layer secured to the first layer and comprising an ultra violet protective layer.

17. The apparatus of claim 15 which further includes a second layer secured to the first layer, and the second layer has a third plurality of light transmitting elements and a fourth layer of light blocking elements, and the third and fourth pluralities of elements are disposed generally perpendicularly to the first and second pluralities of elements.

18. The apparatus of claim 15 which further includes a second layer secured to the first layer, and the second layer comprises a light reflecting layer.

19. The apparatus of claim 1 in which the first and second pluralities comprise a panel in which the first and second pluralities are disposed in alternating rows.

\* \* \* \* \*